(12) United States Patent
Xie

(10) Patent No.: US 10,547,177 B2
(45) Date of Patent: Jan. 28, 2020

(54) ENERGIZATION METHOD AND APPARATUS FOR POWER STRIP, AND STORAGE MEDIUM

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 167 days.

(21) Appl. No.: 15/809,573

(22) Filed: Nov. 10, 2017

(65) Prior Publication Data
US 2018/0138707 A1 May 17, 2018

(30) Foreign Application Priority Data
Nov. 16, 2016 (CN) .......................... 2016 1 1008165

(51) Int. Cl.
*H02J 3/14* (2006.01)
*G06F 1/26* (2006.01)
*H02J 3/00* (2006.01)

(52) U.S. Cl.
CPC ................ *H02J 3/14* (2013.01); *G06F 1/266* (2013.01); *G06F 2200/261* (2013.01); *H02J 3/005* (2013.01)

(58) Field of Classification Search
CPC ............... H01H 47/00; H01H 2300/03; H01R 13/6683; H01R 25/003; H02J 13/00; H02J 3/005; Y04S 20/14; Y02B 90/224; G06F 2200/261; G06F 1/266
See application file for complete search history.

(56) References Cited

U.S. PATENT DOCUMENTS

| 5,418,679 | A | 5/1995 | Crane |
| 6,744,150 | B2 * | 6/2004 | Rendic ..................... G06F 1/266 |
| | | | 307/115 |
| 2007/0149013 | A1 * | 6/2007 | Eastham ............ H01R 13/7036 |
| | | | 439/140 |
| 2009/0284875 | A1 | 11/2009 | Ford |
| 2013/0162053 | A1 * | 6/2013 | Iizuka ..................... H01H 47/00 |
| | | | 307/140 |

(Continued)

FOREIGN PATENT DOCUMENTS

| CN | 202094400 U | 12/2011 |
| CN | 103236613 A | 8/2013 |

(Continued)

OTHER PUBLICATIONS

European Extended Search Report dated Apr. 4, 2018 for EP Application No. 17196834.0, 7 pages.

(Continued)

*Primary Examiner* — Jared Fureman
*Assistant Examiner* — Duc M Pham
(74) *Attorney, Agent, or Firm* — Arch & Lake LLP

(57) ABSTRACT

The present disclosure relates to an energization method and apparatus for a power strip, and a storage medium. The method includes: de-energizing respective sockets of a power strip, detecting use states of the respective sockets of the power strip using independently powered sensors, and controlling the first socket to be energized when the use state of a first socket of the power strip is having a plug inserted therein.

13 Claims, 11 Drawing Sheets

(56) References Cited

U.S. PATENT DOCUMENTS

2016/0079718 A1* 3/2016 Rohr .................. H01R 13/7038
  439/188
2016/0126682 A1 5/2016 Vasquez

FOREIGN PATENT DOCUMENTS

| CN | 104733941 A | 6/2015 |
|----|-------------|--------|
| CN | 104810685 A | 7/2015 |
| CN | 105428923 A | 3/2016 |
| CN | 205231349 U | 5/2016 |
| CN | 205248554 U | 5/2016 |
| EP | 0621659 A1 | 10/1994 |
| KR | 20150096042 A | 8/2015 |

OTHER PUBLICATIONS

Chinese First Office Action dated May 4, 2018 for CN Application No. 201611008165.9, 8 pages.

* cited by examiner

ENERGIZATION METHOD AND APPARATUS FOR POWER STRIP, AND STORAGE MEDIUM

CROSS-REFERENCE TO RELATED APPLICATIONS

This application is based on and claims the priority of the Chinese patent application No. 201611008165.9, filed on Nov. 16, 2016, the entire contents of which are incorporated herein by reference in their entirety.

TECHNICAL FIELD

The present disclosure relates to the technical field of smart homes, and more particularly, to an energization method, an apparatus and a storage medium for a power strip.

BACKGROUND

Generally, various plugs can be inserted into a socket so as to connect with other circuits. With social development and technical progress, people are pursuing a convenient and comfortable life. To meet such requirements, various electrical products are developed, and multiple sockets are needed. Therefore, power strips with multiple sockets play an increasingly important role, and have become a necessity in daily life.

SUMMARY

Examples of the present disclosure provide an energization method, an apparatus and a storage medium for a power strip.

According to a first aspect of the present disclosure, an energization method for a power strip is provided. The method may include: de-energizing respective sockets of a power strip, detecting use states of the respective sockets of the power strip using independently powered sensors, and controlling the first socket to be energized when the use state of a first socket of the power strip is having a plug inserted therein.

According to a second aspect of an example of the present disclosure, an energization apparatus for a power strip is provided. The apparatus may include: a processor, and a memory configured to store instructions executable by the processor, where the processor may be configured to: de-energize respective sockets of a power strip, detect use states of the respective sockets of the power strip using independently powered sensors, and control the first socket to be energized when the use state of a first socket of the power strip is having a plug inserted therein.

According to a third aspect of an example of the present disclosure, a non-transitory computer-readable storage medium is provided. The non-transitory computer-readable storage medium may store instructions, and when the instructions are executed by a processor of an apparatus may cause the apparatus to perform: de-energizing respective sockets of a power strip, detecting use states of the respective sockets of the power strip using independently powered sensors, and controlling the first socket to be energized when the use state of a first socket of the power strip is having a plug inserted therein.

It should be understood that both the foregoing general description and the following detailed descriptions are only exemplary and explanatory and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

DETAILED DESCRIPTION

Figure 1:
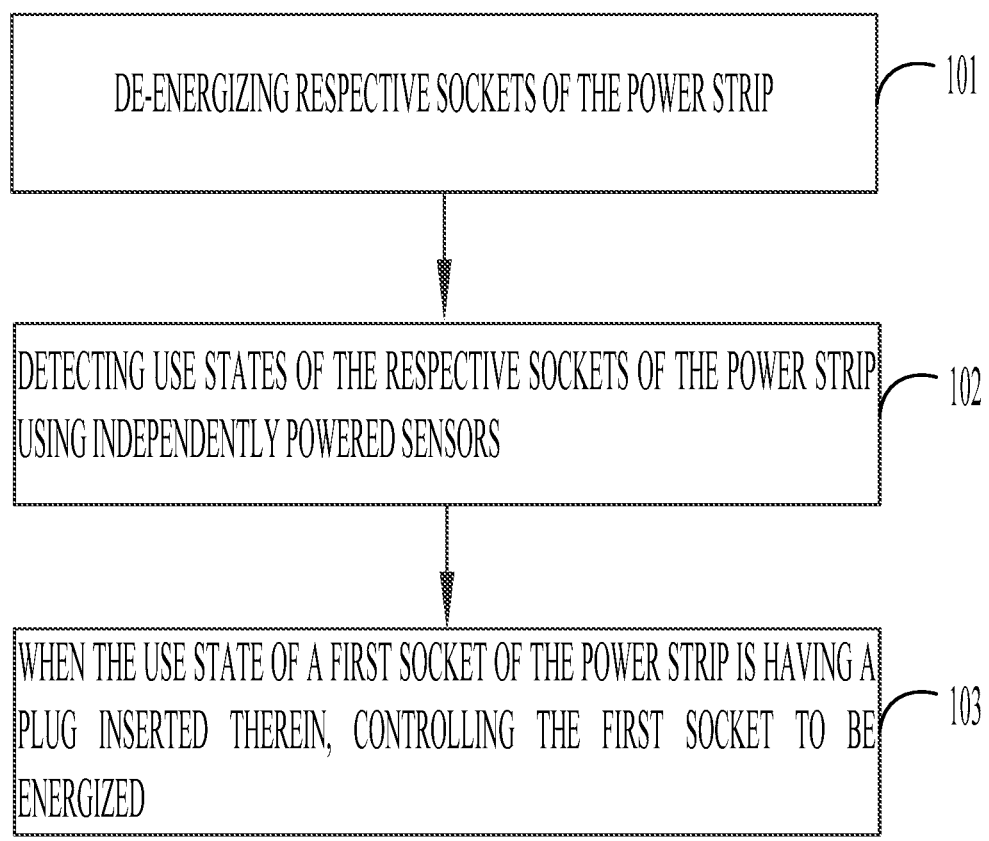
FIG. 1 is shows flow chart of an energization method for a power strip according to an aspect of the present disclosure.

Examples of the present disclosure are illustrated in the accompanying drawings. The following description refers to the accompanying drawings in which the same numbers in different drawings represent the same or similar elements unless otherwise indicated. The implementations set forth in the following description of examples of the present disclosure do not represent all implementations consistent with the present disclosure. Instead, they are merely examples of apparatuses and methods consistent with aspects related to the present disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment," "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

A power strip can be energized according to two methods. In the first method, when the power strip is connected with a power supply, all sockets of the power strip are directly energized. As such, some sockets having no plug inserted therein are also energized, which may easily result in occurrence of electric shock due to the inadvertent contact or the false contact.

In the second method, when the power strip is connected with a power supply and a power button corresponding to a socket is pressed down, the socket of the power strip is energized. This method requires a user to press down the corresponding power button by hand. In addition, the user may forget to reset the button after pulling off the plug from the socket. Accordingly, the socket may be energized even if it has no plug inserted therein, which may easily result in occurrence of electric shock due to an inadvertent contact or a false contact.

In order to solve the above problems, the present disclosure provides an example that can detect the use status of the respective sockets of the power strip using sensors. Only when it is detected that a socket of the power strip has a plug inserted therein, can the socket be energized. Thus, the example of the present disclosure can reduce the risk of occurrence of electric shock due to the inadvertent contact, and further the present example does not require a user's manual operation to energize the sockets. Thereby, the user's operations can be reduced.

FIG. 1 shows a flow chart of an energization method for a power strip according to an aspect of the present disclosure. As shown in FIG. 1, the method may be implemented by a power strip, a terminal or the like. The method may include steps 101-103.

In Step 101, respective sockets of the power strip are de-energized.

In Step 102, use states of the respective sockets of the power strip are detected using independently powered sensors.

In Step 103, when the use state of a first socket of the power strip has a plug inserted therein, the first socket is controlled to be energized.

In the present example, sensors are arranged on the power strip for detecting the use states of the respective sockets of the power strip. The energization method for the power strip according to the present example can be implemented by using an energization apparatus in a power strip or terminal.

In the present example, each socket may correspond to a sensor for detecting the use state of the corresponding socket. Since the sensor needs to detect use states of respective sockets all the time, the power strip may independently supply power to these sensors after being energized, and respective sockets of the power strip may be de-energized. A socket can be energized only when the corresponding sensor detects that the socket has a plug inserted therein. Independent power supply here may refer to using a power supply circuit different from that for sockets.

In the present example, the energization method for a power strip can be applied to an energization apparatus in a terminal. After detecting the use states of respective sockets, sensors of the power strip can send the use states of respective sockets to the energization apparatus in the terminal via wireless communication. In this way, the energization apparatus in the terminal can detect use states of respective sockets via sensors.

Alternatively, the energization method for a power strip can be applied to the energization apparatus in the power strip. After detecting the use states of respective sockets, the sensors can send the use states of respective sockets to the energization apparatus in the power strip. In this way, the energization apparatus in the power strip can detect the use states of respective sockets via the sensors.

In the present example, the energization apparatus in the terminal or the power strip may acquire the use states of respective sockets. For example, the power strip has socket 1, socket 2 and socket 3, and the energization apparatus may need to de-energize socket 1, socket 2 and socket 3. If the energization apparatus learns that only the use state of socket 1 has a plug inserted therein, the energization apparatus controls socket 1 to be energized so as to supply power to the inserted plug. As socket 2 and socket 3 are in the use states that have no plug inserted therein, the energization apparatus may control not to energize socket 2 and socket 3. Therefore, the risk of occurrence of electric shock due to the inadvertent contact or the false contact can be reduced.

The present example can detect the use states of the respective sockets of the power strip using sensors. Only when a socket of the power strip is connected with a plug, the socket may be energized. Thus, the present example can reduce the risk of occurrence of electric shock due to the inadvertent contact or the false contact. The present example does not require a user's manual operation to energize the sockets, and thereby reduces the user's operations.

As a possible example, step 102 may include steps A1 and A2.

In Step A1, the light intensity information corresponding to the respective sockets of the power strip is detected using light intensity sensors. The light intensity information may indicate light intensities of the respective sockets.

In step A2, when the light intensity information corresponding to the first socket of the power strip is less than or equal to the preset light intensity threshold, the use state of the first socket of the power strip is determined to have a plug inserted therein.

In the present example, when the light intensity information corresponding to the first socket of the power strip is greater than the preset light intensity threshold, the use state of the first socket of the power strip is determined to have no plug inserted therein.

In the present example, the sockets of the power strip may include various sockets supplying power to corresponding plugs, such as Universal Serial Bus (USB) sockets, two-phase sockets and three-phase sockets.

If a plug is inserted to a socket, the plug can block light rays. Therefore, in the present example, a light intensity sensor can be arranged for each socket of the power strip. The light intensity sensor can be disposed at a position guaranteeing that the light intensity information detected by the light intensity sensor can be used to indicate the light intensity in the socket. For example, the light intensity sensor can be disposed in a hole of the socket or on the power strip panel covered by the plug.

When the sensor is placed in the hole, the higher light intensity in the hole of the socket may represent the higher light intensity in the socket to which the hole belongs. Thus, after the energization apparatus detects the light intensity information corresponding to respective sockets of the power strip, and if the light intensity information corresponding to a socket on the power strip is less than or equal to a preset light intensity threshold, then it may indicate the low light intensity in the socket and the socket may have a plug inserted therein. As such, the use state of the socket can be determined to have a plug inserted therein. If the light intensity information corresponding to a socket of the power strip is greater than the preset light intensity threshold, it may indicate the high light intensity in the socket and the socket may not have a plug inserted therein. As such, the use state of the socket can be determined to have no plug inserted therein.

In the present example, in order to obtain an appropriate light intensity value whereby it can be discerned to be the most favorable degree whether the socket has a plug inserted therein, then big data analysis may be conducted. As such, the data may be collected regarding the light intensity information corresponding to a socket detected by the light intensity sensor when the socket has no plug inserted therein along with light intensity information corresponding to a socket detected by the light intensity sensor when the socket has a plug inserted therein. The light intensity value obtained may be preset as the light intensity threshold.

For example, assuming that the light intensity value from completely dark to fully bright may be 0-100 and the preset light intensity threshold is 20. When it is detected by a light intensity sensor that the light intensity information corresponding to a socket is 2 which is less than the preset light intensity threshold 20, it is determined that the socket has a plug inserted therein and the socket is controlled to be energized.

The present disclosure provides an example that can detect the light intensity corresponding to respective sockets of a power strip via light intensity sensors. The example can thus determine the use states of respective sockets of the power strip conveniently and accurately.

With the method described in the example above, in a completely dark environment such as a night with lights off, the energization apparatus may detect that light intensity information corresponding to each socket of the power strip using the light intensity sensor is less than or equal to the preset light intensity threshold. Thus, the energization apparatus may control respective sockets to be energized, and can cause electric shock due to the inadvertent contact or the false contact.

Therefore, as a possible implementation, in order to improve the accuracy to determine the use states of sockets and to reduce the rate of false determination, step A2 can be applied as step A21.

In step A21, when the light intensity information corresponding to the first socket of the power strip is less than or equal to the preset light intensity threshold and the light intensity information corresponding to at least one second socket other than the first socket is greater than the preset light intensity threshold, the use state of the first socket of the power strip is determined to have a plug inserted therein.

In this example, if the light intensity information corresponding to at least one socket such as the second socket of the power strip is greater than the preset light intensity threshold, it may indicate that the power strip is not in a completely dark environment. Thus, if light intensity in another socket such as the first socket of the strip is less than or equal to the preset light intensity threshold, the use state of the first socket of the power strip can be determined to have a plug inserted therein, and the first socket may be controlled to be energized.

The present example can determine that a socket of the power strip has a plug inserted therein when the power strip is not in a completely dark environment. The determination method in the present example may be more accurate than merely determining whether a socket has a plug by individually detecting the light intensity information corresponding to the socket and individually comparing the light intensity information with the preset light intensity threshold.

However, for the above implementation, it may not be sufficient to determine that a plug is inserted in the socket when no socket is discovered to have the light intensity information that is greater than the preset light intensity threshold.

Thus, an additional light sensor may be need to be placed on the outside of the power strip. For example, in additional to place a light sensor in each socket, an additional light sensor may be placed on the outside of the power strip. When the light intensity information for a socket is detected by the light sensor for the socket and is less than or equal to the preset light intensity threshold, the additional light intensity information from the additional light sensor may be used to determine whether it is in the night or in a completely dark environment.

During the night or when the power strip is in a completely dark environment, the additional light intensity information from the additional light sensor may also be less than or equal to the preset light intensity threshold when the light intensity information for a socket is detected by the light sensor for the socket and is less than or equal to the preset light intensity threshold. Thus, when both the light intensity information for a socket detected for the light sensor for the socket and the additional light intensity information from the additional light sensor are both less than or equal to the preset light intensity threshold, the socket may not be determined to have a plug inserted. However, when the light intensity information for a socket detected for the light sensor for the socket is less than or equal to the preset light intensity threshold and at the same time the additional light intensity information from the additional light sensor is greater than the preset light intensity threshold, the socket can be determined to have a plug inserted therein.

As a possible implementation, step 102 may include steps B1 and B2.

In Step B1, a distance between an inserted object in each of the respective sockets and the distance sensor is detected by a distance sensor where the distance sensor can detect the distance between an object and the distance sensor itself.

In Step B2, when a distance between an inserted object in the first socket of the power strip and the distance sensor is less than or equal to a preset distance threshold, the use state of the first socket of the power strip is determined as having a plug inserted therein.

In the present example, when the distance to the distance sensor is greater than the preset distance threshold, the use state of the first socket of the power strip is determined as having no plug inserted therein.

If a socket has a plug inserted therein, the plug may be close to respective corresponding parts of the socket. Therefore, a distance sensor can be provided for each socket on the power strip, and the distance sensor is disposed at a position that the distance information detected by the distance sensor can be used to indicate whether the socket has a plug inserted therein. For example, the distance sensor can be disposed in a hole of the socket. If the distance sensor in the hole detects that the inserted object is close to the distance sensor, it may indicate that the socket to which the hole belongs has a plug inserted therein.

In this way, the energization apparatus can detect the distance information between inserted objects in respective sockets of the power strip and the distance sensors. There is no distance information if no inserted object is detected, and thus it indicates that the socket may have no plug inserted therein. If distance information is detected and the distance is less than or equal to the preset distance threshold, it indicates that the socket may have a plug inserted therein. Then, the use state of the socket can be determined as having a plug inserted therein.

In this implementation, the maximal distance between the inserted object and the distance sensor detected by the distance sensor when the socket has a plug inserted therein and can be energized may be collected and preset as a distance threshold. The distance threshold may be 5 mm or any other empirical values that can be used in practice.

The present implementation can determine that a socket of the power strip has a plug inserted therein when detecting by a distance sensor that the distance between an inserted object in the socket and the distance sensor is less than or equal to a preset distance threshold. The present implementation thus may not make false determination in various illumination conditions. The determination method is thus more accurate than other implementations.

As a possible example, step 102 may include steps C1 and C2.

In step C1, when the light intensity information corresponding to each socket of the power strip is less than or equal to the preset light intensity threshold, a distance sensor detects a distance between an inserted object in each of the respective sockets and the distance sensor.

In step C2, when a distance between an inserted object in the first socket of the power strip and the distance sensor is less than or equal to a preset distance threshold, the use state of the first socket of the power strip is determined as having a plug inserted therein.

In the present example, if the light intensity sensor detects that light intensity information corresponding to the first socket on the power strip is less than or equal to the preset threshold, the use state of the first socket of the power strip may be determined as having a plug inserted therein. However, at night with lights off or in other completely dark environments, the energization apparatus may also detect that light intensity information corresponding to each socket is less than or equal to the preset light intensity threshold. As such, the energization apparatus may make a false determination that each socket has a plug inserted therein.

In order to reduce the false determination, in this example, when the light intensity sensor detects that the light intensity information corresponding to each socket of the power strip is less than or equal to the preset threshold, distances between the inserted objects in respective sockets of the power strip and the distance sensors can be detected with the distance sensor. When the distance between the inserted object in the first socket of the power strip and the distance sensor is less than or equal to the preset distance threshold, it indicates that the first socket may have a plug inserted therein. Thus, the use state of the first socket of the power strip can be determined as having a plug inserted therein. When the distance between the inserted object in the first socket of the power strip and the distance sensor is greater than the preset distance threshold, it indicates that the first socket may have no plug inserted therein, and that the use state of the first socket of the power strip may be determined as having no plug inserted therein.

The present example can determine whether a socket of the power strip has a plug inserted therein when detecting by a light intensity sensor that the light intensity information corresponding to the socket is less than or equal to the preset light intensity threshold. Thus, the occurrence of false determination can be reduced. The determination method is more accurate than other implementations.

In a possible example, when a socket is a two-phase socket, a sensor may be arranged in a recess between two holes of the two-phase socket; and when a socket is a three-phase socket, a sensor may be arranged in a recess between three holes of the three-phase socket.

Figure 2:
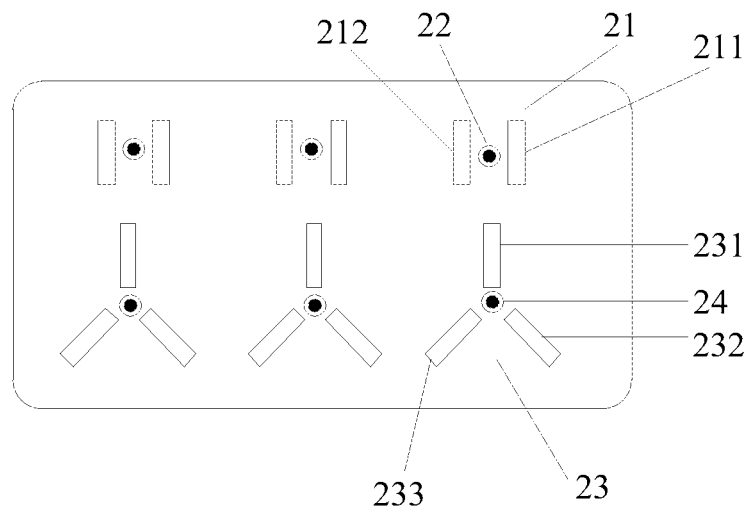
FIG. 2 shows schematic structural view of a power strip according to an aspect of the present disclosure.

In the example, FIG. 2 shows a schematic view of arrangement positions of sensors in a power strip according to an aspect of the present disclosure. Referring to FIG. 2, when the socket is a two-phase socket 21, a recess 22 can be arranged between the hole 211 and the hole 212 of the two-phase socket so as to arrange the sensor in the recess 22. When the socket is a three-phase socket 23, a recess 24 can be arranged between the hole 231, the hole 232 and the hole 233 of the three-phase socket 23 so as to arrange the sensor in the recess 24. The sensor may be configured to detect an inserted object in the socket, so the sensor may be exposed in the air.

In the present example, the sensor may include a light intensity sensor arranged in the recess. If the socket has a plug inserted therein, the plug can block the light ray that is directed into the recess. As such, when the light intensity sensor can detect that the light intensity in the recess, namely the light intensity information corresponding to the socket, is less than or equal to the preset light intensity threshold, it can be determined that that the socket has a plug inserted therein.

In the present example, the sensor can also include a distance sensor arranged in the recess. If a plug is inserted into a socket, the pins of the plug may be inserted into the holes and the surface of the plug shall be above the recess. As such, when the distance sensor can detect that the distance between the inserted object in the socket and the distance sensor is less than or equal to the distance threshold, it can be determined that the socket has a plug inserted therein.

By placing a sensor in a recess at the center of each socket, the present example can be implemented easily without having to change other parts of the power strip, and thus, the manufacture of the power strip can be facilitated.

As a possible example, a sensor may be arranged at the bottom of a hole of each socket. In the present example, a sensor can be directly arranged at bottom of a hole of each socket.

Figure 3:
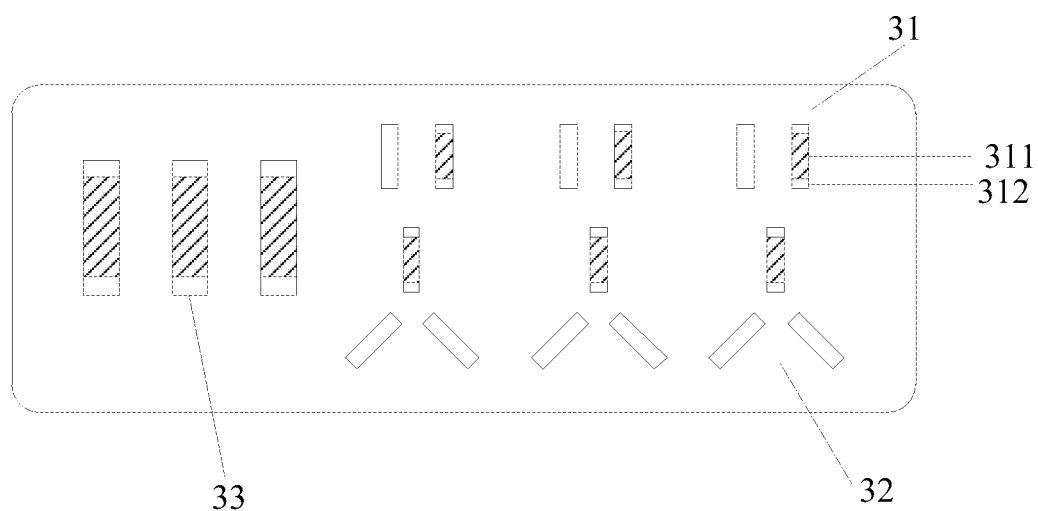
FIG. 3 shows another schematic structural view of a power strip according to an aspect of the present disclosure.

FIG. 3 shows a schematic view of arrangement positions of sensors in a power strip according to an aspect of the present disclosure. Referring to FIG. 3, when the socket is a two-phase socket 31, a three-phase socket 32 or a USB socket 33, the bottom of the hole can be divided into two regions, namely a plug contact region 311 and a sensor arrangement region 312. As such, the bottom of the pin of the plug can be taper-shaped so as to only contact the contact region 311. The area of the bottom of the pin may not exceed that of the plug contact region. To detect whether there may be an inserted object in the socket, the sensor may be exposed in the air.

In the example, the sensor may include a light intensity sensor arranged in a hole. If a plug is inserted into a socket, the plug can block the light ray irradiating into the hole. The light intensity sensor can detect the light directed into the hole. When the light intensity sensor can detect that the light intensity in the hole, namely that the light intensity information corresponding to the socket, is less than or equal to the preset light intensity threshold, it can be determined that the socket has a plug inserted therein.

In the present example, the sensor can also include a distance sensor arranged in a hole. If a plug is inserted into a socket, the pins of the plug may be inserted into the holes and the bottoms of the pins of the plug are above the bottoms of the holes. As such, when the distance sensor can detect that the distance between the inserted object in the socket and the distance sensor is less than or equal to the preset distance threshold, it can be determined that the socket has a plug inserted therein.

In the present example, a sensor may be arranged at the bottom of a hole of each socket, so that the use state of each socket of the power strip detected by the sensor is more accurate.

The implementation process is described in detail through the following examples.

Figure 4:
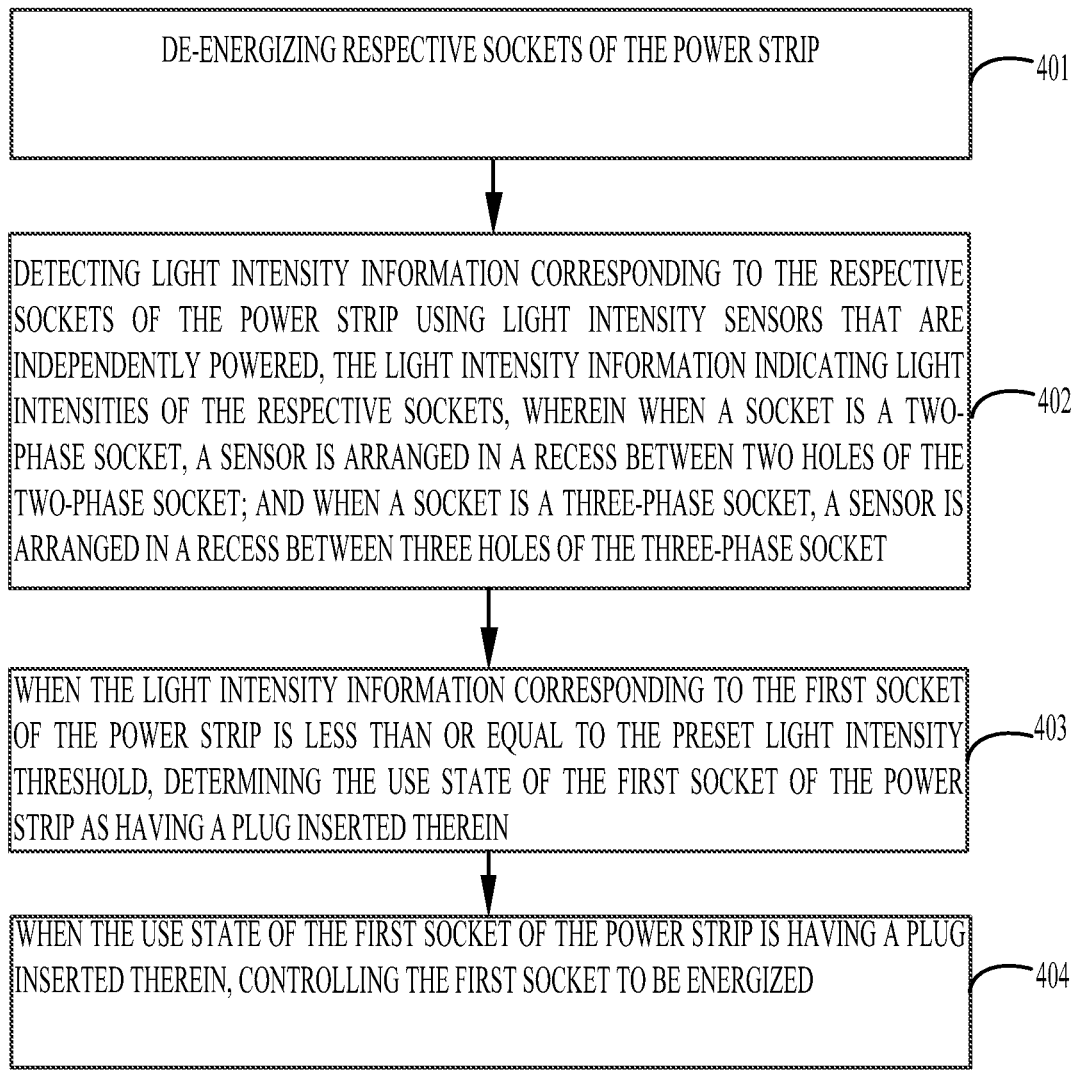
FIG. 4 is shows flow chart of an energization method for a power strip according to another aspect of the present disclosure.

FIG. 4 shows a flow chart of an energization method for a power strip according to another aspect of the present disclosure. As shown in FIG. 4, the method may be implemented by a power strip, a terminal or the like, and the method may include steps 401-404.

In Step 401, respective sockets of the power strip are de-energized.

In Step 402, the light intensity information corresponding to the respective sockets of the power strip is detected using light intensity sensors. The light intensity sensors may be independently powered. The light intensity information may indicate light intensities of the respective sockets. When a socket is a two-phase socket, a sensor may be arranged in a recess between two holes of the two-phase socket. When a socket is a three-phase socket, a sensor may be arranged in a recess between three holes of the three-phase socket.

In Step 403, when the light intensity information corresponding to the first socket of the power strip is less than or equal to the preset light intensity threshold, the use state of the first socket of the power strip may be determined as having a plug inserted therein.

In Step 404, when the use state of the first socket of the power strip has a plug inserted therein, the first socket is controlled to be energized.

Figure 5:
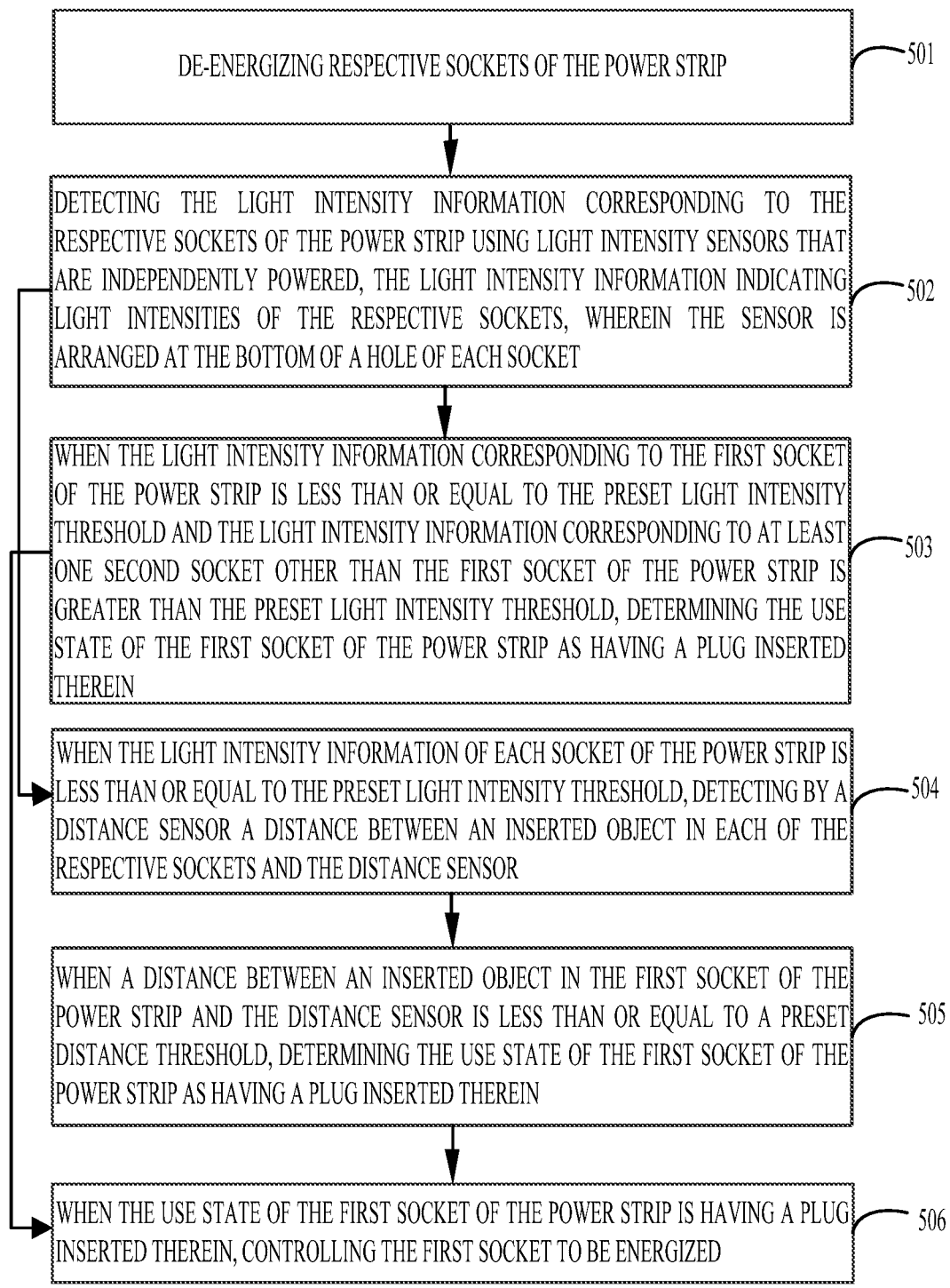
FIG. 5 shows a flow chart of an energization method for a power strip according to a further aspect of the present disclosure.

FIG. 5 shows a flow chart of an energization method for a power strip according to a further aspect of the present disclosure. As shown in FIG. 5, the method may be implemented by a power strip, a terminal or the like. The method may include steps 501-506.

In Step 501, respective sockets of the power strip are de-energized.

In Step 502, the light intensity information corresponding to the respective sockets of the power strip is detected using light intensity sensors. The light intensity sensors may be independently powered. The light intensity information may indicate light intensities of the respective sockets. The sensor may be arranged at the bottom of a hole of each socket.

In Step 503, when the light intensity information corresponding to the first socket of the power strip is less than or equal to the preset light intensity threshold and the light intensity information corresponding to at least one second socket other than the first socket of the power strip is greater than the preset light intensity threshold, the use state of the first socket of the power strip may be determined as having a plug inserted therein.

In Step 504, when the light intensity information of each socket of the power strip is less than or equal to the preset light intensity threshold, a distance between an inserted object in each of the respective sockets and the distance sensor is detected by a distance sensor.

In Step 505, when a distance between an inserted object in the first socket of the power strip and the distance sensor is less than or equal to a preset distance threshold, the first socket of the power strip may be determined as having a plug inserted therein.

In Step 506, when the use state of the first socket of the power strip has a plug inserted therein, the first socket may be controlled to be energized.

Figure 6:
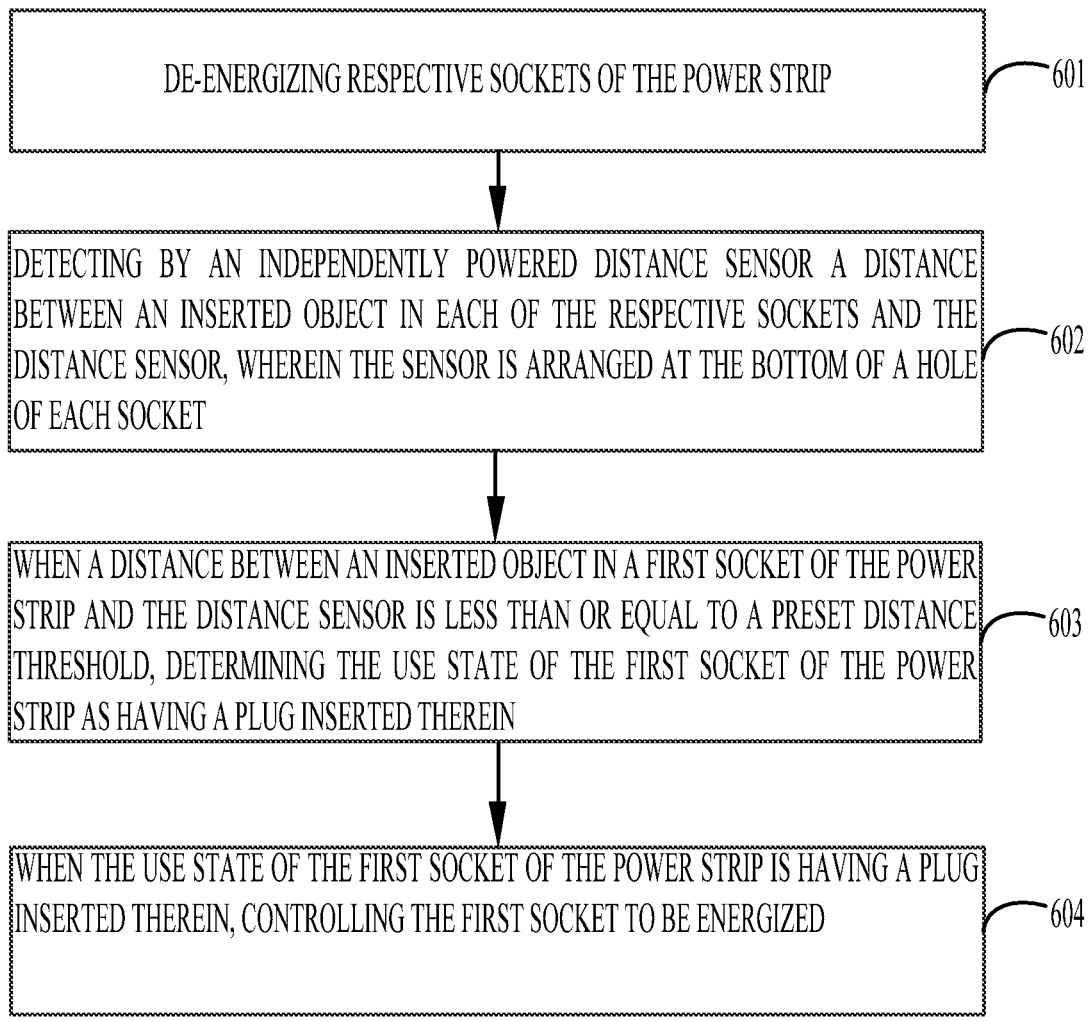
FIG. 6 shows a flow chart of an energization method for a power strip according to yet another aspect of the present disclosure.

FIG. 6 is a flow chart showing an energization method for a power strip according to yet another aspect of the present disclosure. As shown in FIG. 6, the method may be implemented by a power strip, a terminal or the like. The method may include steps 601-604.

In Step 601, respective sockets of the power strip are de-energized.

In Step 602, a distance between an inserted object in each of the respective sockets and an independently powered distance sensor is detected by the distance sensor. The sensor may be arranged at the bottom of a hole of the socket.

In Step 603, when a distance between an inserted object in a first socket of the power strip and the distance sensor is less than or equal to a preset distance threshold, the use state of the first socket of the power strip may be determined as having a plug inserted therein.

In Step 604, when the use state of the first socket of the power strip has a plug inserted therein, the first socket may be controlled to be energized.

The following are apparatus examples of the present disclosure, which may be used to execute the method examples.

Figure 7:
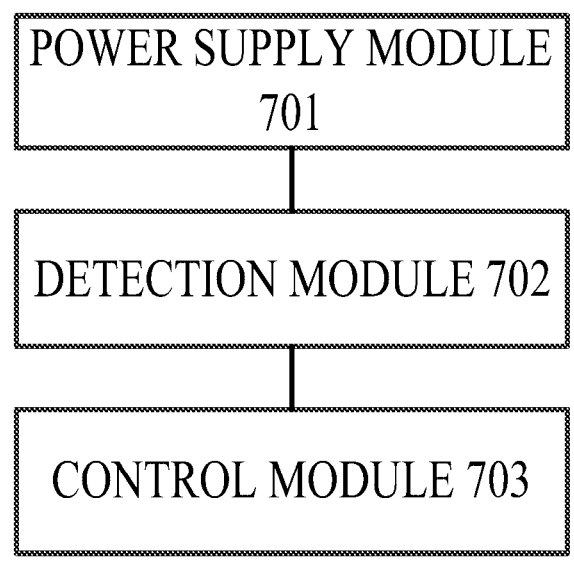
FIG. 7 shows a block view of an energization apparatus for a power strip according to an aspect of the present disclosure.

FIG. 7 is a block view of an energization apparatus for a power strip according to an aspect of the present disclosure. The apparatus may be implemented as a part or the entirety of an electronic device through software, hardware or a combination thereof. As shown in FIG. 7, the energization apparatus for a power strip may include a power supply module 701, a detection module 702 and a control module 703.

The power supply module 701 may be configured to control power supply of respective sockets of the power strip and to de-energize the respective sockets of the power strip.

The detection module 702 may be configured to detect use states of the respective sockets of the power strip using independently powered sensors.

The control module 703 may be configured to, when the use state of a first socket of the power strip has a plug inserted therein, control the first socket to be energized.

Figure 8:
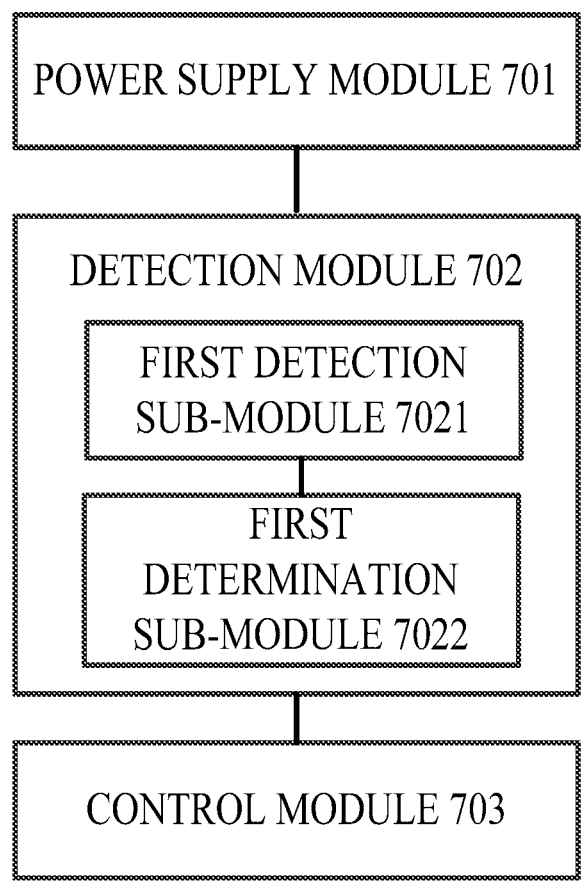
FIG. 8 shows a block view of an energization apparatus for a power strip according to another aspect of the present disclosure.

As a possible example, in the above energization apparatus for a power strip, the detection module 702 may be configured to include a first detection sub-module 7021 and a first determination sub-module 7022. FIG. 8 shows a block view related to an energization apparatus for a power strip.

The first detection sub-module 7021 may be configured to detect the light intensity information corresponding to the respective sockets of the power strip using light intensity sensors. The light intensity information may indicate light intensities of the respective sockets.

The first determination sub-module 7022 may be configured to, when the light intensity information corresponding to the first socket of the power strip is less than or equal to a preset light intensity threshold, determine the use state of the first socket of the power strip as having a plug inserted therein.

As a possible example, the first determination sub-module 7022 may be configured to determine the use state of the first socket of the power strip as having a plug inserted therein when the light intensity information corresponding to the first socket of the power strip is less than or equal to the preset light intensity threshold, and the light intensity information corresponding to at least one second socket other than the first socket of the power strip is greater than the preset light intensity threshold.

Figure 9:
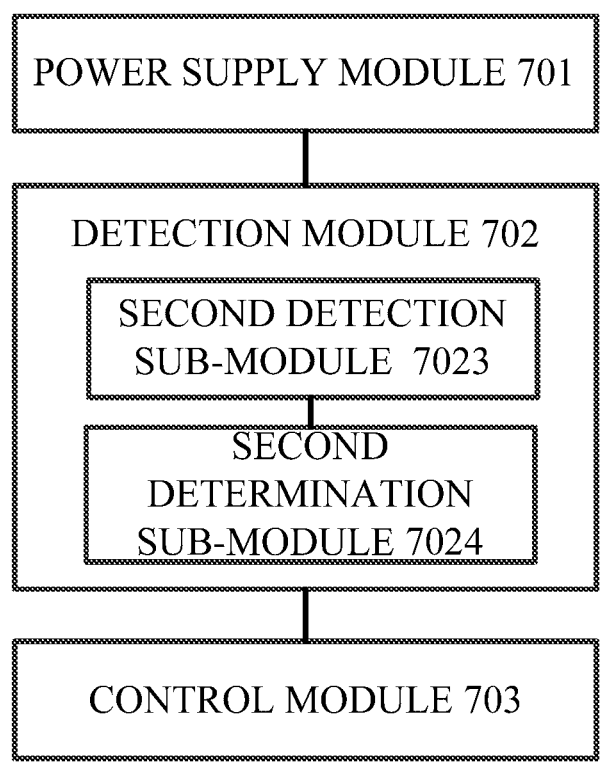
FIG. 9 shows a block view of an energization apparatus for a power strip according to a further aspect of the present disclosure.

As a possible example, in the above energization apparatus for a power strip, the detection module 702 may be configured to include a second detection sub-module 7023 and a second determination sub-module 7024. FIG. 9 is a block view related with such an energization apparatus for a power strip.

The second detection sub-module 7023 may be configured to detect by a distance sensor a distance between an inserted object in each of the respective sockets and the distance sensor.

The second determination sub-module 7024 may be configured to determine the use state of the first socket of the power strip as having a plug inserted therein when a distance between an inserted object in the first socket of the power strip and the distance sensor is less than or equal to a preset distance threshold.

Figure 10:
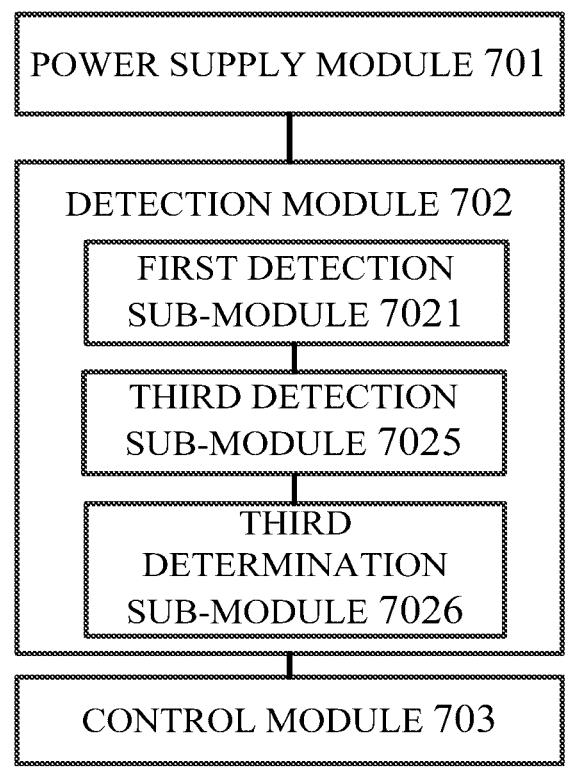
FIG. 10 shows a block view of an energization apparatus for a power strip according to yet another aspect of the present disclosure.

As a possible example, in the above energization apparatus for a power strip, the detection module 702 may be configured to include a third detection sub-module 7025 and a third determination sub-module 7026. FIG. 10 is a block view related with such an energization apparatus for a power strip.

The third detection sub-module 7025 may be configured to detect by a distance sensor a distance between an inserted object in each of the respective sockets and the distance sensor when the light intensity information of each socket of the power strip is less than or equal to the preset light intensity threshold.

The third determination sub-module 7026 may be configured to, when a distance between an inserted object in the first socket of the power strip and the distance sensor is less than or equal to a preset distance threshold, determine the use state of the first socket of the power strip as having a plug inserted therein.

As a possible example, when a socket is a two-phase socket, a sensor may be arranged in a recess between two holes of the two-phase socket. When a socket is a three-phase socket, a sensor may be arranged in a recess between three holes of the three-phase socket.

As a possible example, a sensor may be arranged at the bottom of a hole of each socket.

Regarding the apparatuses in the above examples, the specific manners for the individual modules to perform operations have been described in detail in the present examples of the related methods and are not elaborated herein.

Figure 11:
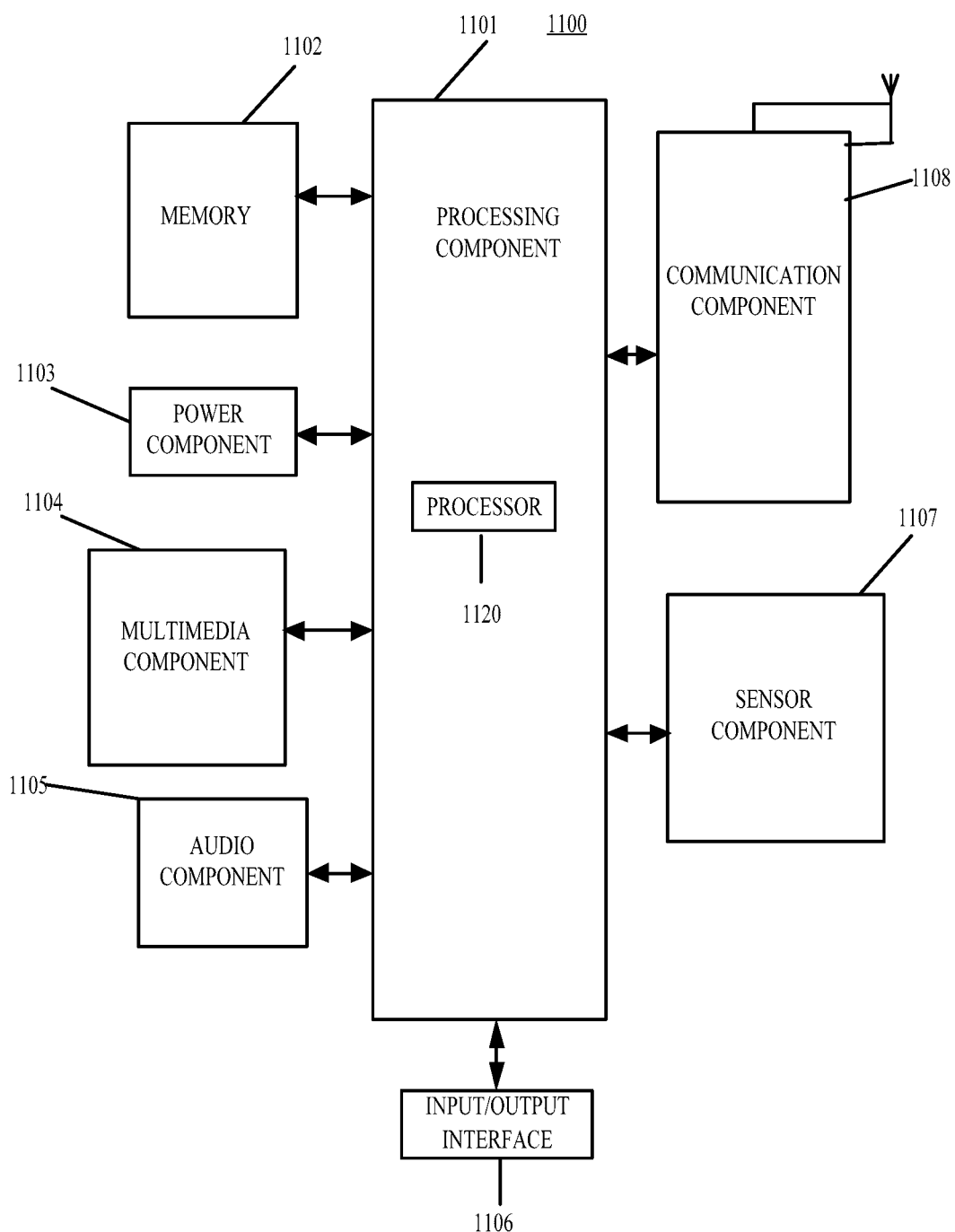
FIG. 11 shows a block view of an example implementation of an energization apparatus for a power strip according to an aspect of the present disclosure.

FIG. 11 shows a block view of an example implementation of an energization apparatus for a power strip according to an aspect of the present disclosure. The apparatus may be applicable to a terminal device. Fox example, the apparatus 1100 may be a mobilized device such as a mobile phone, a game console, a computer, a tablet device, a personal digital assistance and the like.

The apparatus 1100 may include one or more following components: a processing component 1101, a memory 1102, a power component 1103, a multimedia component 1104, an audio component 1105, an input/output (I/O) interface 1106, a sensor component 1107 and a communication component 1108.

The processing component 1101 typically controls overall operations of the apparatus 1100, such as the operations associated with display, data communications, multimedia operations and recording operations. The processing component 1101 may include one or more processors 1120 to execute instructions to perform all or part of the steps in the above described methods. Moreover, the processing component 1101 may include one or more modules which facilitate the interaction between the processing component 1101 and other components. For example, the processing component 1101 may include a multimedia module to facilitate the interaction between the multimedia component 1104 and the processing component 1101.

The memory 1102 may be configured to store various types of data to support the operation of the apparatus 1100. Examples of such data may include instructions for any applications or methods operated on the apparatus 1100, various kinds of data, messages, pictures, video, etc. The memory 1102 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1103 provides power to various components of the apparatus 1100. The power component 1103 may include a power management system, one or more power sources, and any other components associated with the generation, management, and distribution of power in the apparatus 1100.

The multimedia component 1104 may include a screen providing an output interface between the apparatus 1100 and the user. In some examples, the screen may include a liquid crystal display (LCD) and a touch panel (TP). If the screen includes a touch panel, the screen may be implemented as a touch screen to receive input signals from the user. The touch panel may include one or more touch sensors to sense touches, swipes and gestures on the touch panel. The touch sensors may not only sense a boundary of a touch or swipe action, but also sense a period of time and a pressure associated with the touch or swipe action. In some examples, the multimedia component 1104 includes a front camera and/or a rear camera. The front camera and the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1105 may be configured to output and/or input audio signals. For example, the audio component 1105 includes a microphone (MIC) configured to receive an external audio signal when the apparatus 1100 is in an operation mode, such as a call mode, a recording mode, and a voice recognition mode. The received audio signal may be further stored in the memory 1102 or transmitted via the communication component 1108. In some examples, the audio component 1105 further includes a speaker to output audio signals.

The I/O interface 1106 provides an interface between the processing component 1101 and peripheral interface modules, such as a keyboard, a click wheel, buttons, and the like. The buttons may include but are not limited to a home button, a sound volume button, a start button and a locking button.

The sensor component 1107 may include one or more sensors to provide status assessments of various aspects of the apparatus 1100. For instance, the sensor component 1107 may detect an open/closed status of the apparatus 1100, relative positioning of components, e.g., the display and the keypad, of the apparatus 1100, a change in position of the apparatus 1100 or a component of the apparatus 1100, presence or absence of user's contact with the apparatus 1100, an orientation or an acceleration/deceleration of the apparatus 1100, and a change in temperature of the apparatus 1100. The sensor component 1107 may include a proximity sensor configured to detect the presence of nearby objects without any physical contact. The sensor component 1107 may also include a light sensor, such as a CMOS or CCD image sensor, for use in imaging applications. In some examples, the sensor component 1107 may also include an accelerometer sensor, a gyroscope sensor, a magnetic sensor, a pressure sensor or a temperature sensor.

The communication component 1108 may be configured to facilitate communication, wired or wirelessly, between the apparatus 1100 and other devices. The apparatus 1100 can access a wireless network based on a communication standard, such as WiFi, 2G, or 3G; or a combination thereof. In one aspect of the present disclosure, the communication component 1108 receives a broadcast signal or broadcast associated information from an external broadcast management system via a broadcast channel. In one aspect of the present disclosure, the communication component 1108 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples of the present disclosure, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an aspect of the present disclosure, there is also provided a non-transitory computer-readable storage medium comprising instructions, such as included in the memory 1102, executable by the processor 1120 in the apparatus 1100, for performing the above-described methods. For example, the non-transitory computer-readable storage medium may be a ROM, a RAM, a CD-ROM, a magnetic tape, a floppy disc, an optical data storage device, and the like.

There is provided an energization apparatus for a power strip. The apparatus may include: a processor, and a memory configured to store instructions executable by the processor. The processor is configured for: de-energizing respective sockets of the power strip; detecting use states of the respective sockets of the power strip using independently powered sensors; and when the use state of a first socket of the power strip is having a plug inserted therein, controlling the first socket to be energized.

The processor may be further configured such that detecting the use states of the respective sockets of the power strip using the independently powered sensors may include: detecting the light intensity information corresponding to the respective sockets of the power strip using light intensity sensors, the light intensity information indicating light intensities of the respective sockets; and when the light intensity information corresponding to the first socket of the power strip is less than or equal to a preset light intensity threshold, determining the use state of the first socket of the power strip as having a plug inserted therein.

The processor may be further configured such that when the light intensity information corresponding to the first socket of the power strip is less than or equal to the preset light intensity threshold, determining the use state of the first socket of the power strip as having a plug inserted therein may include: when the light intensity information corresponding to the first socket of the power strip is less than or equal to the preset light intensity threshold, and the light intensity information corresponding to at least one second socket other than the first socket of the power strip is greater than the preset light intensity threshold, determining the use state of the first socket of the power strip as having a plug inserted therein.

The processor may be further configured such that detecting the use states of the respective sockets of the power strip using the independently powered sensors may include: detecting by a distance sensor a distance between an inserted object in each of the respective sockets and the distance sensor; when a distance between an inserted object in the first socket of the power strip and the distance sensor is less than or equal to a preset distance threshold, determining the use state of the first socket of the power strip as having a plug inserted therein.

The processor may be further configured such that detecting the use states of the respective sockets of the power strip using the independently powered sensors may include: when the light intensity information of each socket of the power strip is less than or equal to the preset light intensity threshold, detecting by a distance sensor a distance between an inserted object in each of the respective sockets and the distance sensor; when a distance between an inserted object in the first socket of the power strip and the distance sensor is less than or equal to a preset distance threshold, determining the use state of the first socket of the power strip as having a plug inserted therein.

The processor may be further configured such that when a socket is a two-phase socket, a sensor is arranged in a recess between two holes of the two-phase socket; and when a socket is a three-phase socket, a sensor is arranged in a recess between three holes of the three-phase socket; the sensor is exposed in the air.

The processor may be further configured such that a sensor is arranged at the bottom of a hole of each socket, and is exposed in the air.

A non-transitory computer-readable storage medium stores executable instructions that, when executed by the processor of the apparatus 1100, cause the apparatus 1100 to execute the above energization method for a power strip. The method may include: de-energizing respective sockets of the power strip; detecting use states of the respective sockets of the power strip using independently powered sensors; and when the use state of a first socket of the power strip is having a plug inserted therein, controlling the first socket to be energized.

The instructions in the storage medium may be configured such that detecting the use states of the respective sockets of the power strip using the independently powered sensors may include: detecting the light intensity information corresponding to the respective sockets of the power strip using light intensity sensors, the light intensity information indicating light intensities of the respective sockets; and when the light intensity information corresponding to the first socket of the power strip is less than or equal to a preset light intensity threshold, determining the use state of the first socket of the power strip as having a plug inserted therein.

The instructions in the storage medium may be configured such that when the light intensity information corresponding to the first socket of the power strip is less than or equal to the preset light intensity threshold, determining the use state of the first socket of the power strip as having a plug inserted therein may include: when the light intensity information corresponding to the first socket of the power strip is less than or equal to the preset light intensity threshold, and the light intensity information corresponding to at least one second socket other than the first socket of the power strip is greater than the preset light intensity threshold, determining the use state of the first socket of the power strip as having a plug inserted therein.

The instructions in the storage medium may be configured such that detecting the use states of the respective sockets of the power strip using the independently powered sensors may include: detecting by a distance sensor a distance between an inserted object in each of the respective sockets and the distance sensor; when a distance between an inserted object in the first socket of the power strip and the distance sensor is less than or equal to a preset distance threshold, determining the use state of the first socket of the power strip as having a plug inserted therein.

The instructions in the storage medium may be configured such that detecting the use states of the respective sockets of the power strip using the independently powered sensors may include: when the light intensity information of each socket of the power strip is less than or equal to the preset light intensity threshold, detecting by a distance sensor a distance between an inserted object in each of the respective sockets and the distance sensor; when a distance between an inserted object in the first socket of the power strip and the distance sensor is less than or equal to a preset distance threshold, determining the use state of the first socket of the power strip as having a plug inserted therein.

The instructions in the storage medium may be configured such that when a socket is a two-phase socket, a sensor may be arranged in a recess between two holes of the two-phase socket; and when a socket is a three-phase socket, a sensor may be arranged in a recess between three holes of the three-phase socket; the sensor is exposed in the air.

The instructions in the storage medium may be configured such that a sensor is arranged at the bottom of a hole of each socket, and is exposed in the air.

Figure 12:
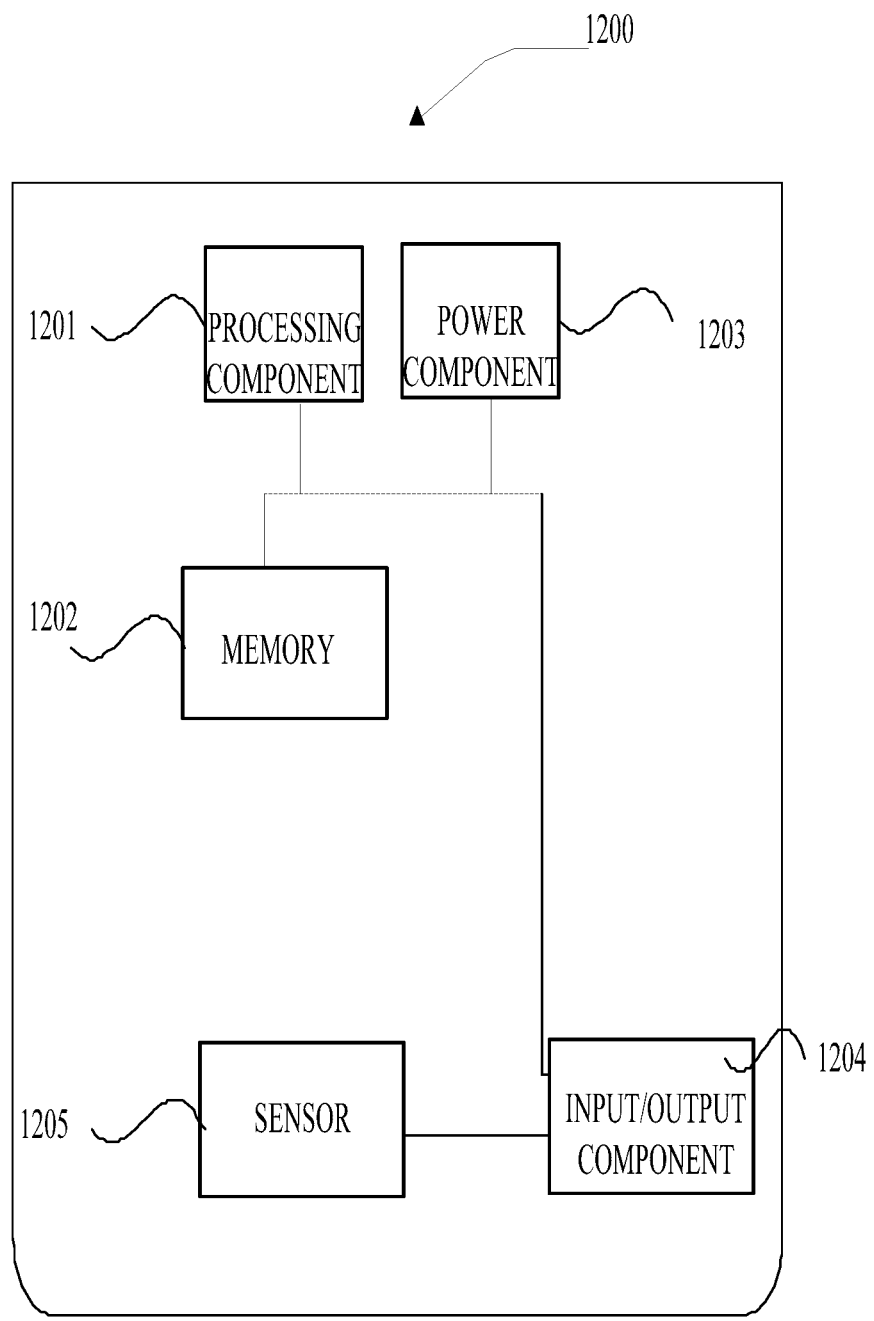
FIG. 12 shows a block view of another example implementation of an energization apparatus for a power strip according to an aspect of the present disclosure.

FIG. 12 is a block view of an example of a cleaning apparatus 1200 of a cleaning robot. For example, the apparatus 1200 may be provided as a power strip. As shown in FIG. 12, the apparatus 1200 includes a processing component 1201 which further includes one or more processors, and memory resources represented by a memory 1202 for storing instructions executable by the processing component 1201, such as application programs. The application programs stored in the memory 1202 may include one or more modules corresponding to a set of instructions. In addition, the processing component 1201 may be configured to perform instructions so as to perform the above methods to energize the respective sockets.

The apparatus 1200 may also include a power component 1203 configured to execute the power supply management of the apparatus 1200, and an input/output (I/O) interface 104 for providing an interface between the processing component 1201 and the sensor 1205. The apparatus 1200 may operate an operating system stored in the memory 1202, such as Windows Server™, Mac OS X™, Unix™ Linux™, FreeBSD™ or the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. An energization method, comprising:
de-energizing respective sockets of a power strip;
detecting use states of the respective sockets of the power strip using independently powered sensors; and
controlling a first socket to be energized when the use state of the first socket of the power strip has a plug inserted therein,
wherein detecting the use states of the respective sockets of the power strip using independently powered sensors comprises:

detecting light intensity information corresponding to the respective sockets of the power strip using light intensity sensors arranged on the power strip, wherein the light intensity information indicates light intensities of the respective sockets; and determining the use state of the first socket of the power strip as having the plug inserted therein when the light intensity information corresponding to the first socket of the power strip is less than or equal to a preset light intensity threshold and the light intensity information corresponding to at least one second socket other than the first socket of the power strip is greater than the preset light intensity threshold.

2. The method of claim 1, wherein detecting the use states of the respective sockets of the power strip using the independently powered sensors comprises:

detecting by a distance sensor a distance between an inserted object in each of the respective sockets and the distance sensor;

determining the use state of the first socket of the power strip as having the plug inserted therein when a distance between an inserted object in the first socket of the power strip and the distance sensor is less than or equal to a preset distance threshold.

3. The method of claim 1, wherein detecting the use states of the respective sockets of the power strip using the independently powered sensors further comprises:

when the light intensity information corresponding to each socket of the power strip is less than or equal to the preset light intensity threshold, detecting by a distance sensor a distance between an inserted object in each of the respective sockets and the distance sensor;

when a distance between an inserted object in the first socket of the power strip and the distance sensor is less than or equal to a preset distance threshold, determining the use state of the first socket of the power strip as having the plug inserted therein.

4. The method of claim 1, wherein:

when a socket is a two-phase socket, a sensor is arranged in a recess between two holes of the two-phase socket; and when a socket is a three-phase socket, the sensor is arranged in a recess between three holes of the three-phase socket.

5. The method of claim 1, wherein a sensor is arranged at the bottom of a hole of each socket.

6. An energization apparatus, comprising: a processor, and a memory configured to store instructions executable by the processor, wherein the processor is configured to:

de-energize respective sockets of a power strip;

detect use states of the respective sockets of the power strip using independently powered sensors; and control a first socket to be energized when the use state of the first socket of the power strip is having a plug inserted therein, wherein the processor is further configured to:

detect light intensity information corresponding to the respective sockets of the power strip using light intensity sensors arranged on the power strip, wherein the light intensity information indicates light intensities of the respective sockets; and determine the use state of the first socket of the power strip as having the plug inserted therein when the light intensity information corresponding to the first socket of the power strip is less than or equal to a preset light intensity threshold and the light intensity information corresponding to at least one second socket other than the first socket of the power strip is greater than the preset light intensity threshold.

7. The apparatus of claim 6, wherein the processor is further configured to:

detect by a distance sensor a distance between an inserted object in each of the respective sockets and the distance sensor;

determine the use state of the first socket of the power strip as having the plug inserted therein when a distance between an inserted object in the first socket of the power strip and the distance sensor is less than or equal to a preset distance threshold.

8. The apparatus of claim 6, wherein the processor is further configured to:

when the light intensity information corresponding to each socket of the power strip is less than or equal to the preset light intensity threshold, detect by a distance sensor a distance between an inserted object in each of the respective sockets and the distance sensor;

when a distance between an inserted object in the first socket of the power strip and the distance sensor is less than or equal to a preset distance threshold, determine the use state of the first socket of the power strip as having the plug inserted therein.

9. The apparatus of claim 6, wherein:

when a socket is a two-phase socket, a sensor is arranged in a recess between two holes of the two-phase socket; and when a socket is a three-phase socket, a sensor is arranged in a recess between three holes of the three-phase socket.

10. The apparatus of claim 6, wherein a sensor is arranged at the bottom of a hole of each socket.

11. A non-transitory computer-readable storage medium having stored therein instructions that, when executed by a processor of an apparatus, cause the apparatus to perform:

de-energizing respective sockets of a power strip;

detecting use states of the respective sockets of the power strip using independently powered sensors; and controlling the first socket to be energized when the use state of a first socket of the power strip is having a plug inserted therein, wherein the instructions further cause the apparatus to perform:

detecting light intensity information corresponding to the respective sockets of the power strip using light intensity sensors arranged on the power strip, wherein the light intensity information indicates light intensities of the respective sockets; and determining the use state of the first socket of the power strip as having the plug inserted therein when the light intensity information corresponding to the first socket of the power strip is less than or equal to a preset light intensity threshold and the light intensity information corresponding to at least one second socket other than the first socket of the power strip is greater than the preset light intensity threshold.

12. The storage medium of claim 11, wherein the instructions that cause the apparatus to perform detecting the use states of the respective sockets of the power strip further cause the apparatus to perform:

detecting by a distance sensor a distance between an inserted object in each of the respective sockets and the distance sensor;

determining the use state of the first socket of the power strip as having the plug inserted therein when a distance between an inserted object in the first socket of the power strip and the distance sensor is less than or equal to a preset distance threshold.

13. The storage medium of claim 11, wherein the instructions that cause the apparatus to perform detecting the use states of the respective sockets of the power strip using the independently powered sensors further cause the apparatus to perform:
when the light intensity information corresponding to each socket of the power strip is less than or equal to the preset light intensity threshold, detecting by a distance sensor a distance between an inserted object in each of the respective sockets and the distance sensor;
when a distance between an inserted object in the first socket of the power strip and the distance sensor is less than or equal to a preset distance threshold, determining the use state of the first socket of the power strip as having the plug inserted therein.

* * * * *